Oct. 6, 1953     A. F. KACHELSKI ET AL     2,654,176
ICE FISHING TIP-UP
Filed Sept. 26, 1949
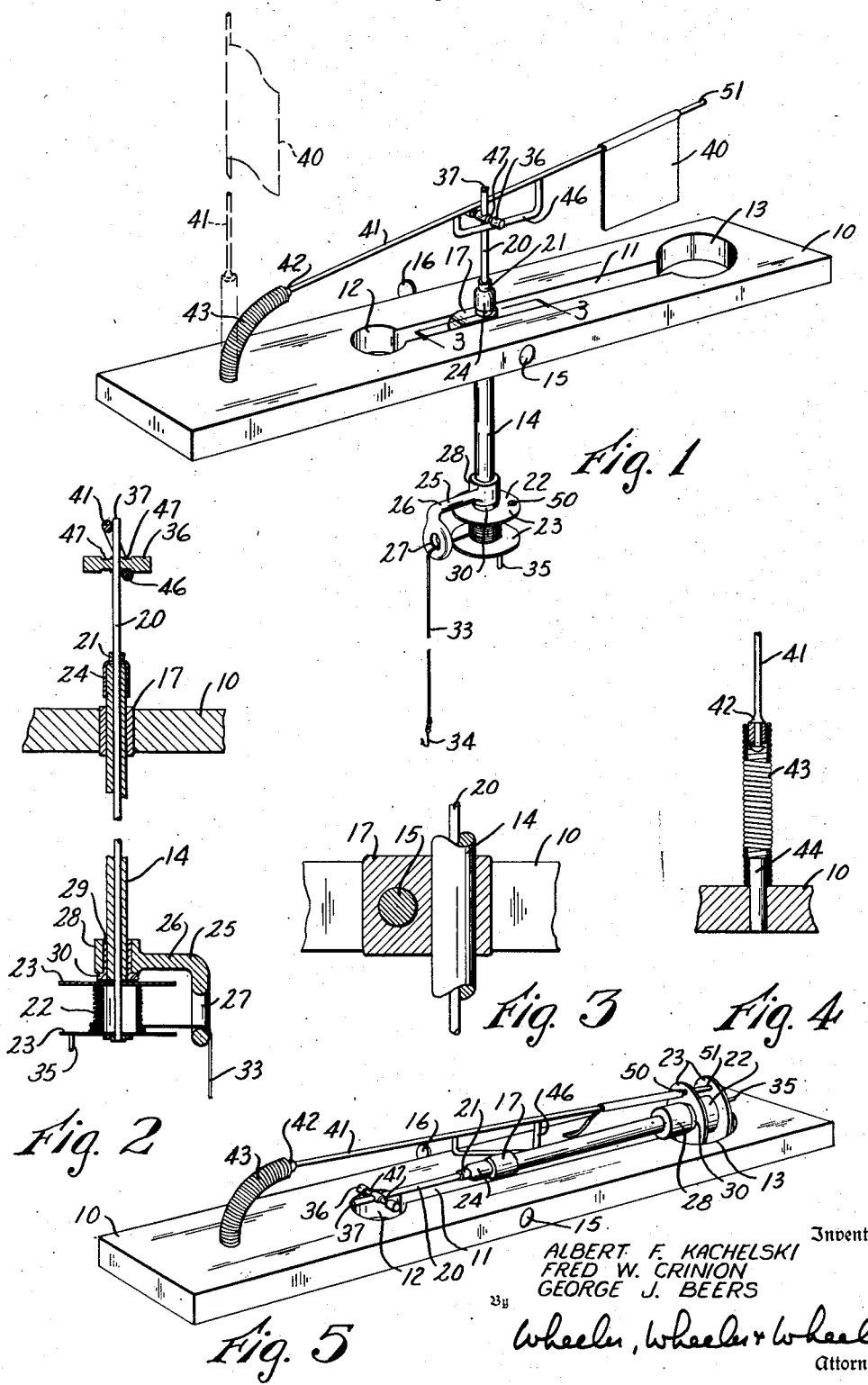
Inventors
ALBERT F. KACHELSKI
FRED W. CRINION
GEORGE J. BEERS
By Wheeler, Wheeler & Wheeler
Attorneys

UNITED STATES PATENT OFFICE 2,654,176

ICE FISHING TIP-UP

Albert F. Kachelski, Fred W. Crinion, and
George J. Beers, Beaver Dam, Wis.

Application September 26, 1949, Serial No. 117,788

13 Claims. (Cl. 43—17)

This invention relates to improvements in ice fishing tip ups.

It is the principal object of the invention to provide an ice fishing tip up having an improved indicator flag releasing mechanism which is wind proof and otherwise operative to release the indicator only upon trigger shaft rotation.

Another object of the invention is to provide an improved spool and line guide assembly co-operative with the flag releasing mechanism for the actuation thereof.

Another object of the invention is to provide such an improved tip up which is so constructed and arranged as to be readily foldable into a compact, transportable assembly.

Other objects will be more apparent from an examination of the following disclosure.

In the drawings:

Figure 1 is a perspective view of the ice fishing device as it would appear operatively disposed over an ice hole with the strike indicator flag in a normally retracted position, the dotted lines showing the flag in a normally released position.

Figure 2 is a cross sectional view taken through the bearing tube showing details of construction of the tube and associated elements.

Figure 3 is a section on line 3—3 of Figure 1 showing the offset pivot mounting of the tube on the base.

Figure 4 is a view in vertical section showing the construction of the flag indicator bias spring and its connection with the flag staff and mounting on the base.

Figure 5 is a perspective view showing the ice fishing device folded for transport.

Ice fishing tip ups are used for the dual purpose of securing a fish line where the fisherman is fishing through a hole in the ice and for visually indicating a fish strike by means of a strike released flag or the like. In this manner the fisherman may fish simultaneously from several holes through the ice and be appraised immediately of a strike occurring at any one of such holes.

The improved tip up includes a base 10 adapted to be supported by ice and to bridge a hole therethrough. It has a longitudinal slot 11 with enlarged openings 12 and 13 at either end of the slot. A trigger shaft bearing tube 14 is pivotally mounted within the slot on pivot pin 15 which is further provided with a wing nut 16. The bearing tube 14 is swingably mounted in the slot 11 and may be frictionally adjusted and bound in any angular position with respect to the base 10 by adjustment of the wing nut 16. The tube, in operative position, is normally upright and at substantially a right angle to the base 10; the upper end of the tube projecting above the base and the lower end of the tube projecting downwardly into the water in the ice hole. The pivot 15 is preferably positioned in an offset boss 17 on the bearing tube so that upon swinging the bearing tube to the folded position best shown in Figure 5, the bearing tube will rise slightly within the slot to clear the bottom of the base 10.

The bearing tube 14 is provided with a trigger shaft 20 rotatable within the bearing tube and which carries a positioning flange 21 at a normally upper portion thereof, and a reel 22 at its end remote from said upper shaft portion. The spool is provided with flanges 23, the innermost flange abutting the lower end margin of the bearing tube 14. Thus the shaft 20 is restrained from longitudinal axial movement within the tube in the limits defined by the respective flanges 21 and 23. The normally upper end of the bearing tube 14 is further provided with a cap 24 providing a seat on which the flange 21 rotates.

The lower end of the tube 14 is further provided with a line guide shown generally as 25 and which comprises an arm 26 and an eye 27. The arm 26 projects substantially at right angles from a collar 28 which is rotatable upon a bushing 29 which is pressed over the end of the bearing tube 14. The bushing is provided with an annular shoulder 30 upon which the line guide collar 28 is rotatably seated. As may be readily understood from the drawings the eye 27 is rotatable on its arm concentrically of the reel 22, so that a line 33 strung through the eye 27 and wound upon the reel 22 is always payed off the reel radially therefrom. As the line guide 25 is rotatable with respect to the bearing tube 14 it will swing in whatever direction a fish taking the hook 34 runs, thereby insuring an even unwinding of the line from the reel. The reel is further provided with a crank 35 for the purpose of rewinding the line on the reel. The tube 14 is desirably packed with a lubricant which does not congeal at water freezing temperature and which prevents entry of water into the trigger shaft bearing. Consequently freedom of trigger action is insured at all operating temperatures.

The upper portion of the trigger shaft 20 is provided with a transverse trigger 36 which is spaced from the end 37 of the shaft. The trigger is rigidly fixed to the shaft so that reel rotation will be transmitted through the shaft to similarly rotate the trigger.

The base 10 is provided at a point remote from the bearing tube pivot 15 with a strike indicator comprising a flag 40 mounted on a flag staff 41 which is swiveled at 42 to the coil spring 43 which is pressed over the end of the pin 44 mounted on the base 10. The coil spring 43 normally biases the strike indicator to a prominent upright position shown in dotted lines in Figure 1. With the ice fishing tip up operatively positioned over the ice hole, the strike indicator is normally depressed against the spring bias to the full line position shown in Figure 1.

The staff 41 is further provided with an offset bar 46 joined at its ends with the staff 41 to form a trigger engaging yoke. As best seen in Figures 1 and 2 it will be noted that the bar 46 is so offset with reference to staff 41 that the staff will take its position on one side of trigger shaft 20 and the bar 46 is disposed on the other side of the shaft. Either the bar 46 or the staff 41 may be engaged beneath the trigger 36, and desirably in the shallow peripheral grooves 47 with which the trigger is provided to act as detents for the more secure positioning of the cocked staff. On rotation of the trigger 36 into parallelism with the engaged staff 41 or bar 46, the trigger will release the staff which will be whipped by the coil spring 43 to the upright position shown in dotted lines in Figure 1. In this action the shoulders of the grooves 47 function as cams to cam the flag staff out of the grooves.

Thus the prominent, released position of the flag visually appraises the fisherman of a strike. Although the flag staff may be engaged beneath the trigger 36 in any convenient fashion it is desirably engaged in the manner shown in Figures 1 and 2. The yoke formed by the staff 41 and the rod 46 embraces the shaft 20 so that the rod 46 is engaged at one side of the shaft 20 beneath the trigger 36, and the staff 41 is contacted above the trigger 36 against the opposite side of the shaft 20. In such an arrangement the strike indicator is restrained from lateral displacement over the ends of the trigger and will not be released by wind or any other similar disturbing elements. The staff is releasable only upon a rotation of the trigger 36 into substantial parallelism with the rod or staff.

To fold the tip up into a compact assembly convenient for transportation in a confined space, it is merely necessary to loosen the wing nut 16 and swing the bearing tube 14 with its associated elements to the position shown in Figure 5. In this folded position reel 22 is nested within the enlarged hole 13 and the trigger 36 is similarly nested within the enlarged hole 12. Flange 23 of the reel 22 is provided with an aperture 50 through which the upper end 51 of the flag staff 41 may be engaged in order to complete the folded assembly. By virtue of its offset bearing pivot 15, the bearing tube may be swung to an above center position thereby clearing the bottom of the base 10.

From the foregoing description it is seen that an ice fishing tip up is provided which has an improved organizational structure which permits foldability of the various elements into a compact assembly. Furthermore, when operatively positioned over a hole in the ice, an improved strike indicator release mechanism is provided which is wind proof and of otherwise improved design so as to effectuate the instant release of the flag to a prominent strike indicating position resultant from trigger shaft rotation caused by a tug on the fish line 33. Only ¼ of a turn of shaft 20 is needed to release the staff 41 and the movement of the trigger is easy, since the margins of the grooves 47 have a camming action in their interaction with the bar 46.

We claim:

1. In an ice fishing tip up the combination with an ice hole spanning base, of a rotatable shaft carried by said base having one end operatively extending upwardly over the base and its other end extending downwardly into the water, the said upper shaft end being provided with a trigger comprising a transverse arm rotatable in its own plane substantially normal to the shaft and the said lower shaft end being provided with an actuator, and a strike indicator provided with a part engageable beneath the trigger arm and biased for upward movement upon rotation of said trigger in its own plane out of engagement with said indicator, said rotational movement being imparted to said trigger through said shaft from said actuator, said shaft being provided with means restraining axial movement thereof against the bias of said part.

2. The device of claim 1 in which the transverse arm of the trigger is provided with a groove within which said part is engageable and with a cam adjacent said groove to cam said part away from said engagement when the arm is rotated.

3. In an ice fishing tip up the combination with an ice hole spanning base, of a rotatable shaft carried by said base having one end operatively extending upwardly over the base and its other end extending downwardly into the water, the said upper shaft end being provided with a trigger comprising a transverse arm rotatable in its own plane substantially normal to the shaft and the said lower shaft and being provided with an actuator, and a strike indicator provided with a part engageable beneath the trigger arm and biased for upward movement upon rotation of said trigger in its own plane out of engagement with said indicator, said rotational movement being imparted to said trigger through said shaft from said actuator, said trigger being spaced from the upper shaft end, said strike indicator comprising a yoke embracing said shaft end with one side of the yoke engageable beneath the trigger at one side of the shaft and the other side of the yoke disposed at the opposite side of the shaft and below its end when the indicator is in normally depressed position.

4. In an ice fishing tip up the combination with an ice hole spanning base, of a rotatable shaft carried by said base having one end operatively extending upwardly over the base and its other end extending downwardly into the water, the said upper shaft end being provided with a trigger comprising a transverse arm rotatable in its own plane substantially normal to the shaft and the said lower shaft and being provided with an actuator, and a strike indicator provided with a part engageable beneath the trigger arm and biased for upward movement upon rotation of said trigger in its own plane out of engagement with said indicator, said rotational movement being imparted to said trigger through said shaft from said actuator, said base being provided with a slot extending longitudinally thereof and with enlarged openings at both ends of the slot, one of said openings being at least large enough to receive the actuator in nested relationship therein, said shaft being rotatably carried in a bearing tube pivotally suspended within said slot and swingable in a plane extending therethrough, said actuator comprising a reel directly axially mounted on a normally water immersed end of said shaft, said bearing tube, trigger, and reel nesting within said slot and oppositely disposed openings upon swinging said tube into substantial parallelism with said base.

5. The device of claim 4 wherein the bearing tube pivot is offset axially from the tube but substantially midway between the upper and lower faces of the base whereby swinging movement of said tube on said pivot into substantial parallelism with said base will dispose said tube asymmetrically with respect to the base.

6. The device of claim 4 wherein said reel is provided with marginal flanges, at least one of which is provided with an aperture and wherein said indicator comprises a flag carried by a flag staff mounted on the base remote from said pivot and having an end extending beyond said flag, said end being insertable into said flange aperture upon swinging said tube into parallelism with said base.

7. In a device of the character described, the subcombination of a bearing tube adapted for pivotal suspension on an ice hole bridging base, a rod rotatable on its axis within the tube, a triggger comprising a transverse arm rotatable in its own plane normal to the axis of rotation of the rod and mounted near one end of the rod, and a spool axially mounted on the remote end of the rod and means confining said rod against axial movement in said tube.

8. The device of claim 7 in further combination with a line guide rotatably swingable on the exterior of the tube near the spool and comprising a collar rotatable on the tube, an arm extending laterally from the collar, and a depending eye forming member carried by the arm in concentric rotatable proximity to the spool flanges.

9. In an ice fishing tip up the combination with an ice hole spanning base having a slot with enlarged openings at either end of the slot, of a flag indicator including a staff mounted on the base remote from the slot and biased to an upright position normal to the base, a bearing tube having an axially offset mounting portion on which the tube is pivoted for swinging movement in the plane of the slot, a shaft axially rotatable within the tube and having a portion projecting longitudinally of the tube carrying a transverse trigger spaced from the upwardly projecting end of said shaft, a reel axially carried on the other end of said shaft and adapted to receive a fish line in wound relation thereon, said flag staff having a yoked portion engageable with the trigger when normally retracted against its upward bias, one side of said yoke being engaged beneath the trigger at one side of the shaft and another side of the yoke being contactable with the shaft above the trigger and at the opposite side of the shaft, said flag staff being released from engagement with said trigger upon rotation of said trigger into substantial parallelism with said staff.

10. The device of claim 9 wherein the trigger is further provided with a peripheral groove for engagement with the said side portion of the yoke, and wherein the tube end proximate the reel is provided with a line guide having an eye in rotatable proximity to the flanges thereof.

11. In a foldable device of the character described a base having a resiliently erect staff mounted thereon, a tubular member for a trigger operating mechanism pivotally secured to the base and having a perforated reel mounted on one end thereof, said staff and tube being swingable into substantial parallelism with the base to bring the staff into inserted position in the perforated reel whereby to hold the device in folded position.

12. In a device of the character described, the combination with a base of a normally erect, resiliently mounted tip up flag and staff therefor swingable on said base into a trigger retained, retracted position; an offset bar connected to said staff; a trigger shaft mounted on said base and receivable between the offset bar and the staff to prevent lateral movement of the staff; a trigger connected to said trigger shaft, and means for moving the trigger to and from a position of engagement with the staff to hold said staff in a retracted position.

13. An ice fishing tip up comprising a base, a signal staff, a mounting for the staff including a spring biasing the staff to erect position, and a trigger shaft carried by said base in a position offset from the signal staff, said shaft being provided at one end with a shaft actuator and at its other end with a cross arm trigger extending transversely of the staff and having one position of rotation in which the staff may be engaged beneath the trigger when the staff is retracted against its spring bias, said shaft having means for containing the upward axial thrust thereby imposed on the shaft, said trigger cross arm having another position of rotation in which it is substantially parallel to the staff to release said staff from engagement, said actuator comprising means for rotating said trigger from said one position to said other position.

ALBERT F. KACHELSKI.
FRED W. CRINION.
GEORGE J. BEERS.

References Cited in the file of this patent

UNITED STATES PATENTS

| Number | Name | Date |
|---|---|---|
| 428,966 | Shaw | May 27, 1890 |
| 446,596 | Hackett | Feb. 17, 1891 |
| 479,219 | Lane | July 19, 1892 |
| 1,333,697 | Barry | Mar. 16, 1920 |
| 1,777,496 | Killory | Oct. 7, 1930 |
| 1,803,914 | Oberg | May 5, 1931 |
| 2,198,286 | Krivutza | Apr. 23, 1940 |
| 2,448,346 | Baugh | Aug. 31, 1948 |
| 2,451,693 | Richards | Oct. 19, 1948 |
| 2,502,231 | Oberg | Mar. 28, 1950 |
| 2,608,783 | Rogers | Sept. 2, 1952 |